Figure 1:
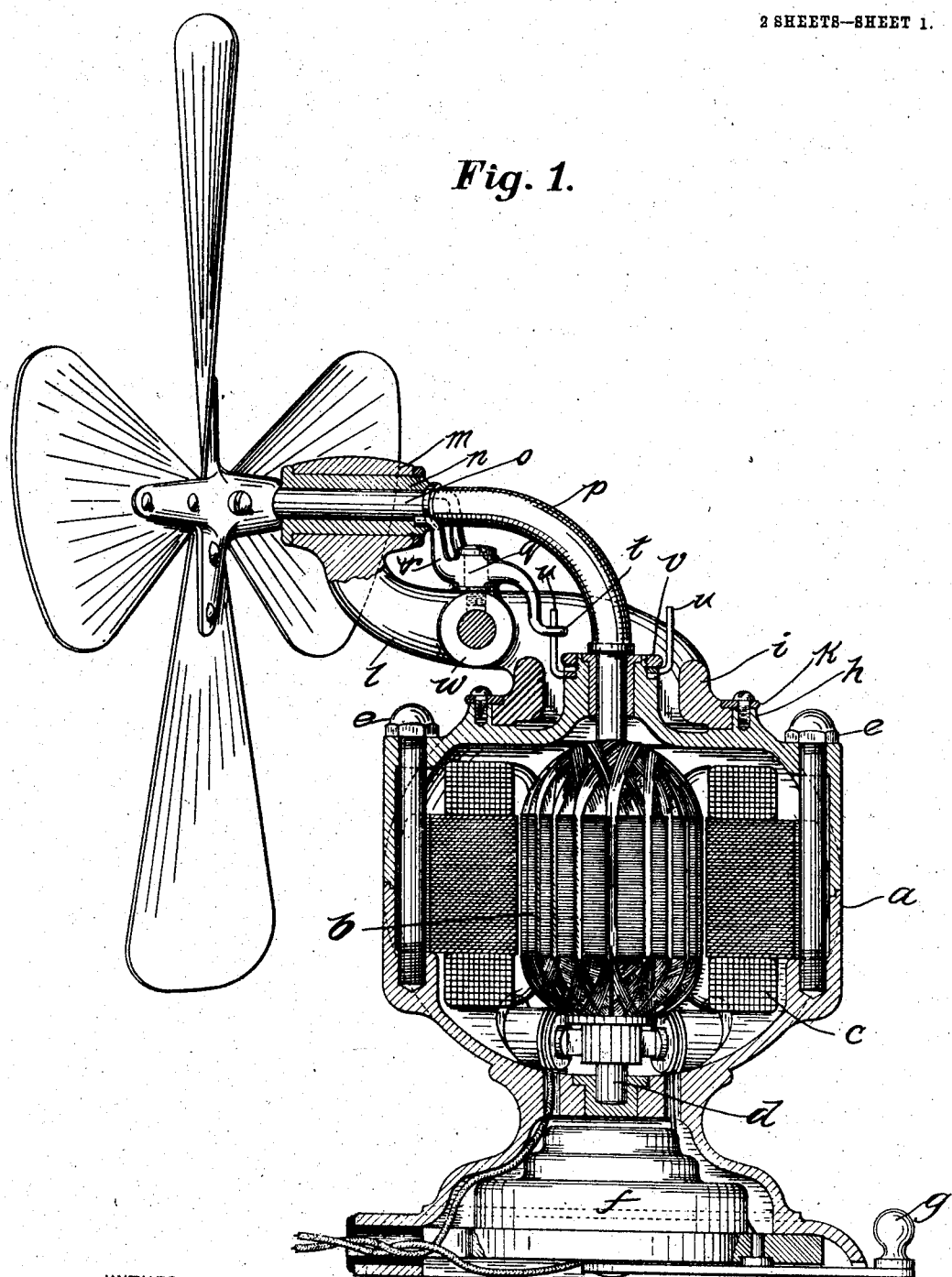

No. 780,740. PATENTED JAN. 24, 1905.
S. R. BACHTEL.
FAN MECHANISM.
APPLICATION FILED OCT. 23, 1902.

2 SHEETS—SHEET 1.

No. 780,740. PATENTED JAN. 24, 1905.
S. R. BACHTEL.
FAN MECHANISM.
APPLICATION FILED OCT. 23, 1902.

2 SHEETS—SHEET 2.

WITNESSES:

INVENTOR
Samuel R. Bachtel
BY
George L. Cragg
ATTORNEY

No. 780,740.                                                           Patented January 24, 1905.

UNITED STATES PATENT OFFICE.

SAMUEL R. BACHTEL, OF LAFAYETTE, INDIANA, ASSIGNOR TO THOMAS DUNCAN, OF LAFAYETTE, INDIANA.

FAN MECHANISM.

SPECIFICATION forming part of Letters Patent No. 780,740, dated January 24, 1905.

Application filed October 23, 1902. Serial No. 128,388.

*To all whom it may concern:*

Be it known that I, SAMUEL R. BACHTEL, a citizen of the United States, residing at Lafayette, in the county of Tippecanoe and State of Indiana, have invented a certain new and useful Improvement in Fan Mechanism, (Case No. 2,) of which the following is a full, clear, concise, and exact description, reference being had to the accompanying drawings, forming a part of this specification.

My invention relates to fan-motors, and has for its object the provision of an improved construction thereof enabling the employment of a prime mover for the fan that may have a stationary support, there being associated with such a prime mover mechanism that will permit a bodily rotation of the fan, with its bearing, so that currents of air may be occasioned through a desirable range, the structure enabling the complete bodily revolution of the fan, with its bearing, or a revolution thereof through a limited angle of reciprocal directions. In constructions hitherto in use the prime mover has been rotatable as an entirety, necessitating considerable expense in construction and necessarily imposing large weight upon the bearing supporting the prime mover, which bearing in order to overcome friction included balls or rollers. By means of my invention the only weight upon the bearing carrying the bodily-movable fan-support is the weight of the fan and its support. This bearing is preferably rotatable upon the stationary casing of the prime mover. The fan is provided with a bearing that defines its axis of rotation, which fan-bearing is so angularly related to the supporting-bearing for the fan structure as to enable the fan in its reaction upon the air to effect the bodily movement of itself and its bearing about the axis of the main supporting-bearing. In order that the fan may be oscillated in its bodily movement, automatic means are provided for oscillating the position of the fan's axis of rotation, so that its direction with respect to the axis of the supporting-bearing may be periodically changed to enable the fan, with its bearings, to bodily reciprocate. As the preferred means for accomplishing this result I employ a bearing-sleeve having a bore diagonally disposed and provide for this bearing-sleeve a second bearing, within which the sleeve is rotatable. The means that permit the oscillation of the fan's axis are associated with the sleeve or bearing that defines the fan's axis of rotation and serve to intermittently arrest the rotation of the sleeve, which otherwise is permitted by the friction between the fan-shaft and the bearing-sleeve. The device for thus intermittently arresting the rotation of said bearing-sleeve preferably comprises an escapement-pawl having two arms adapted to be alternately engaged by the bearing-sleeve and a third arm interposed between two lugs, which lugs by alternately engaging the third arm serve to effect the oscillation of the escapement to alternately bring one or the other of the first two arms into engagement with the said bearing-sleeve. The axis of the fan is thus periodically shifted, so that the fan, with its support, is bodily moved in reciprocal directions by the action of the fan in the air. These lugs are preferably relatively adjustable, so that the range of the angular movement of the fan may be regulated. The lugs being also preferably movable are displaceable from the path of the arm of the escapement that may be interposed between the same, whereby complete bodily rotation of the fan, with its support, may be effected. The connection between the motive element of the prime mover and the fan may be had by means of a flexible shaft. The prime mover that is well adapted for the operation of the fan is an electric motor, and there may be provided in the motor-casing starting and regulating switching apparatus.

There are features of my invention that are adaptable for fan-motors having prime movers not stationarily mounted.

I will explain my invention more fully by reference to the accompanying drawings, in which—

Figure 2:
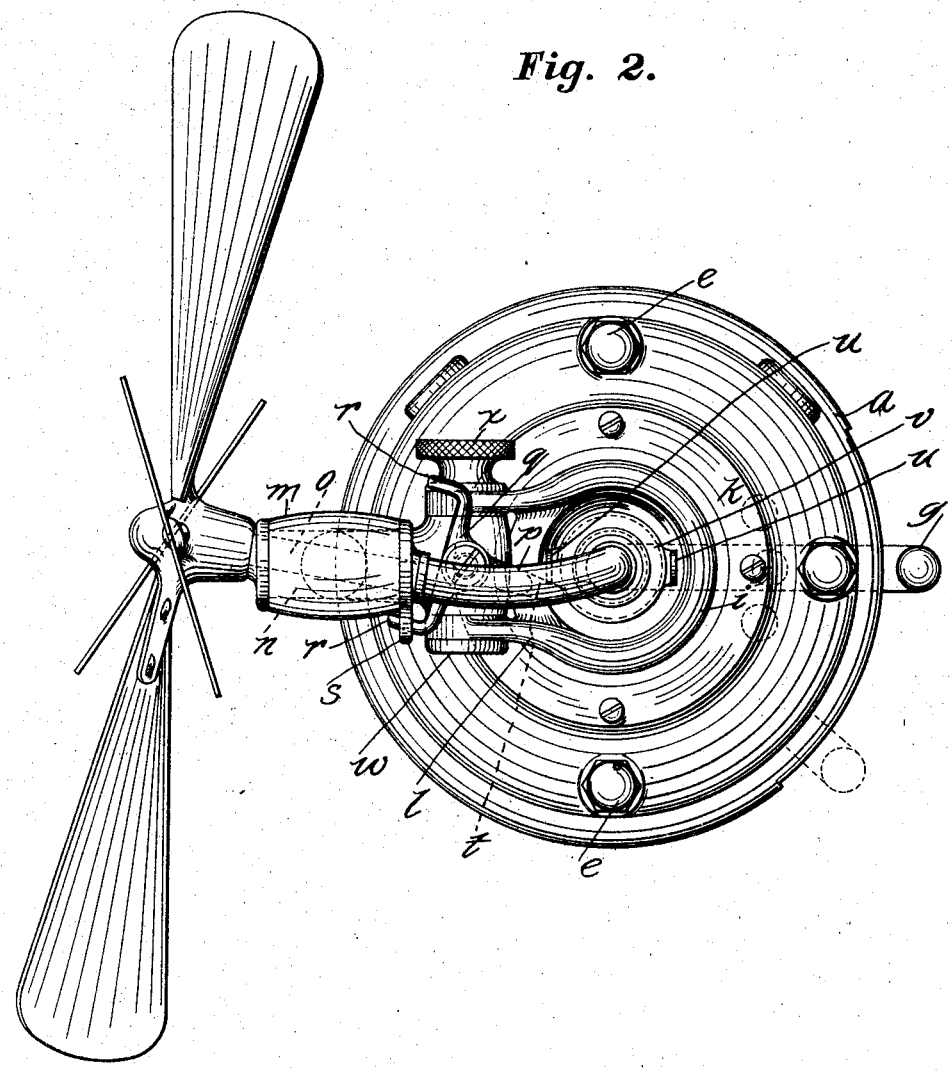

Figure 1 illustrates, partially in section and partially in elevation, the preferred form of my invention. Fig. 2 is a plan view of the structure shown in Fig. 1.

Like characters of reference indicate similar parts throughout both figures.

In the embodiment of the invention shown the casing *a* of the prime mover is vertically disposed and the rotative element *b* of the prime mover has its axis vertically arranged within the casing. The particular form of prime mover shown is an electric motor, and the field-coils *c* thereof are supported by the casing, while the armature *b* is mounted upon a shaft *d*, journaled in upper and lower bearings supported by the casing. The casing *a* is preferably made in sections united by the stud-bolts *e*, while the bottom of the casing is made hollow to accommodate the usual rheostat *f*, with its controlling-switch *g*, the commutator-brushes in connection with this rheostat being preferably disposed at the lower end of the armature, so that connections may readily be made therewith. The upper end or top of the casing is preferably provided with an annular rim *h*, that is preferably centrally arranged with respect to the axis of rotation of the armature and within which is disposed the rotating support *i*, that is prevented from vertical displacement by means of a washer *k*, that engages the upper rim portion of the rotating support *i*. The rotating support *i*, being somewhat in the nature of a ring, preferably, at its base, is permitted to rotate about an axis that is substantially coincident with the axis of rotation of the armature, as preferred. In this way the casing of the motor may be maintained stationary, while the bodily movement of the fan-support *i* may readily be effected in a preferred way, more fully to be set forth. The bracket *l* forms a continuation of the portion *i* and terminates at its upper end in a hub or bearing *m*, within which bearing is disposed the fan's bearing *n*. The fan is provided with a shaft *o*, that is preferably rigid at its ends where it is in driving engagement with the fan and the prime mover and has an intermediate section *p*, which is flexible, so that the axis of the fan and the rotating element of the prime mover may desirably be displaced. In the device of my present invention, however, the relation of the axis of the rotating element of the prime mover and the fan are only regulated by convenience in construction, as will be obvious by inspection of the drawings. By adopting the relative association of parts illustrated, however, a very simple and compact structure is assured. The bearing *n*, that defines the fan's axis of rotation, is preferably horizontal and is so disposed with reference to the axis of rotation of the base *i* as to enable the fan-blades by their reaction upon the air to effect a bodily movement of the fan's support *i l* about the axis of the element *b*. Where it is desired to effect reciprocal movements of the fan with its support, I provide a means for oscillating the position of the fan's axis of rotation, and in order to enable the said means to very effectively operate I provide the sleeve *n* with a diagonal bore, so that the axis of this bore is displaced with respect to the outer bearing or hub *m*. The position of the axis of the bore of sleeve *n* is changeable with respect to the hub *m* and the axis of rotation of the base *i*. By reason of the friction between the sleeve *n* and the fan's shaft there is a constant tendency on the part of the fan-shaft to rotate said sleeve. Mechanism is provided which intermittently arrests the rotation of the sleeve *n*, which mechanism is preferably in the form of a rotatably-mounted escapement *q*, provided with arms *r*, adapted to be alternately placed within the path of a lug *s*, mounted upon the sleeve *n*, preferably by having a nut integrally formed therewith that has threaded engagement with the sleeve *n*, which nut also takes part in preventing longitudinal displacement between the bearings *n* and *m*. On the opposite side of the pivot of the pawl or escapement *q* there is provided a single arm *t*, that is interposed between the lugs *u u*, that are stationarily mounted, preferably by being clamped, upon the projection of the casing *a*, being desirably secured upon the upper bearing of the armature-shaft. As the fan, with its support, is bodily moved the arm *t* is alternately engaged by lugs *u u* to effect the withdrawal of one of the arms *r* from the path of the lug *s* and the location of the other arm *r* within the path of this lug, the arms *r r* being alternately placed within and withdrawn from the path of the said lug *s*. Thus the sleeve *n* is intermittently permitted to rotate within the bearing *m*, and although such rotation of the sleeve *n* is in a uniform direction the position of the axis of rotation of the fan is oscillated with respect to the axis of rotation of the base *i* and with respect to the bearing *n*. A threaded nut *v* serves to clamp the lug *u* in position, these lugs being relatively adjustable to vary the space between the same and being preferably slotted at their bases to enable their complete removal.

The bracket *l* is preferably formed in relatively movable sections linked at *w*, a clamping-nut *x* being employed for securing the relative positions in which the sections of the bracket may be disposed. In this way the axis of rotation of the fan may be inclined with respect to the horizontal, if desired.

It is obvious that changes may be made in the construction without departing from the spirit of my invention.

Having thus described my invention, I claim as new and desire to secure by Letters Patent—

1. The combination with a rotatable fan, of a bearing therefor, permitting the bodily rotation of the fan, the axes of the fan and bearing being angularly related to enable the fan by striking the air to effect such bodily rotation, and a stationarily-mounted prime mover having driving connection with the fan, substantially as described.

2. The combination with a rotatable fan, of a bearing therefor, permitting the bodily rotation of the fan, automatic means for changing the adjustment of the fan's axis with respect to the bearing to permit the fan to effect its own bodily rotation in alternate directions, and a stationarily-mounted prime mover in driving connection with the fan, substantially as described.

3. The combination with a rotatable fan, of a bearing therefor, permitting the bodily rotation of the fan, a bearing defining the fan's axis of rotation, automatic means for oscillating the position of the said bearing, and a stationarily-mounted prime mover in driving engagement with the fan, substantially as described.

4. The combination with a fan, of a shaft therefor, a bearing-sleeve having a bore diagonally disposed within the same, and a second bearing within which the first bearing is rotated, whereby bodily rotation of the fan and said first-mentioned bearing may be effected, substantially as described.

5. The combination with a fan, of a shaft therefor, a bearing-sleeve having a bore diagonally disposed within the same, a second bearing within which the first bearing is rotated, and a prime mover in driving connection with the fan, whereby bodily rotation of the fan and said first-mentioned bearing may be effected, substantially as described.

6. The combination with a rotatable fan, of a shaft therefor, a bearing-sleeve having a bore diagonally disposed within the same, a second bearing within which the first bearing is rotated, automatic means for periodically preventing rotation between said bearings, whereby rotation of the fan and said first-mentioned bearing may be effected, substantially as described.

7. The combination with a rotatable fan, of a shaft therefor, a bearing-sleeve having a bore diagonally disposed within the same, a second bearing within which the first bearing is rotated said second bearing being mounted for bodily rotation, a prime mover in driving connection with the fan, and automatic means for periodically preventing rotation between said bearings, whereby bodily rotation of the fan and said first-mentioned bearing may be effected alternately in opposite directions, substantially as described.

8. The combination with a rotatable fan, of a shaft therefor, a bearing-sleeve having a bore diagonally disposed within the same, a second bearing within which the first bearing is rotated, and a rotatable mounting for the fan and the aforesaid bearings, providing an axis of rotation angularly related to the axes of the aforesaid bearings, substantially as described.

9. The combination with a rotatable fan, of a shaft therefor, a bearing-sleeve having a bore diagonally disposed within the same, a second bearing within which the first bearing is rotated, a prime mover in driving connection with the fan, and a rotatable mounting for the fan and the aforesaid bearings, providing an axis of rotation angularly related to the axes of the aforesaid bearings, substantially as described.

10. The combination with a rotatable fan, of a shaft therefor, a bearing-sleeve having a bore diagonally disposed within the same, a second bearing within which the first bearing is rotated, automatic means for periodically preventing rotation between said bearings, and a rotatable mounting for the fan and the aforesaid bearings, providing an axis of rotation angularly related to the axes of the aforesaid bearings, substantially as described.

11. The combination with a rotatable fan, of a shaft therefor, a bearing-sleeve having a bore diagonally disposed within the same, a second bearing within which the first bearing is rotated, a prime mover in driving connection with the fan, automatic means for periodically preventing rotation between the said bearings, and a rotatable mounting for the fan and the aforesaid bearings, providing an axis of rotation angularly related to the axes of the aforesaid bearings, substantially as described.

12. The combination with a prime mover disposed within a stationary casing, of a rotatable mounting upon said casing and a fan supported by the rotatable mounting and in driving connection with said prime mover and having its axis so angularly disposed with respect to the axis of the rotatable mounting as to enable the fan to effect its own bodily rotation upon its support, substantially as described.

13. The combination with a prime mover disposed within a stationary casing, of a rotatable mounting upon said casing, a fan supported by the rotatable mounting and in driving connection with said prime mover and having its axis so angularly disposed with respect to the axis of the rotatable mounting as to enable the fan to effect its own bodily rotation upon its support, and automatic means for oscillating the position of the fan's axis with respect to its rotatable mounting to effect a bodily oscillating movement of the fan, substantially as described.

14. The combination with a prime mover disposed within a stationary casing, of a rotatable mounting upon said casing, a fan supported by the rotatable mounting and in driving connection with said prime mover and having its axis so angularly disposed with respect to the axis of the rotatable mounting as to enable the fan to effect its own bodily rotation upon its support, and adjusting means interposed between the fan and its rotatable mounting, permitting the vertical adjustment of the fan, substantially as described.

15. The combination with a prime mover disposed within a stationary casing, of a rotatable mounting upon said casing, a fan supported by the rotatable mounting and in driving connection with said prime mover and having its axis so angularly disposed with respect to the axis of the rotatable mounting as to enable the fan to effect its own bodily rotation upon its support, a bearing for that bearing defining the fan's axis of rotation, an oscillated escapement provided with two arms upon one side alternately engaged by the bearing that defines the fan's axis of rotation and upon the other side having one arm, and lugs between which the latter arm is disposed, and alternately engaged thereby, substantially as described.

16. The combination with a prime mover disposed within a stationary casing, of a rotatable mounting upon said casing, a fan supported by the rotatable mounting and in driving connection with said prime mover and having its axis so angularly disposed with respect to the axis of the rotatable mounting as to enable the fan to effect its own bodily rotation upon its support, a bearing for that bearing defining the fan's axis of rotation, an oscillating escapement provided with two arms upon one side alternately engaged by the bearing that defines the fan's axis of rotation and upon the other side having one arm, and adjustable lugs between which the latter arm is disposed, and alternately engaged thereby, substantially as described.

17. The combination with a fan, of a prime mover for operating the fan, a bracket formed in relatively movable sections mounted on the prime mover's casing, a flexible shaft interposed between the fan and the prime mover, and means for automatically changing the axis of rotation of said fan, substantially as described.

In witness whereof I hereunto subscribe my name this 8th day of October, A. D. 1902.

SAMUEL R. BACHTEL.

Witnesses:
 GRANT BELTZ,
 CHARLES JONES.